Feb. 16, 1932. L. K. TITUS 1,845,532

AXLE BENDING APPARATUS

Filed Feb. 7, 1927

Leonard K. Titus
INVENTOR.

BY
ATTORNEYS.

Patented Feb. 16, 1932

1,845,532

UNITED STATES PATENT OFFICE

LEONARD K. TITUS, OF LOS ANGELES, CALIFORNIA

AXLE BENDING APPARATUS

Application filed February 7, 1927. Serial No. 166,354.

My invention relates to axle bending apparatus, and more particularly to a portable, practical, economical and effective apparatus by means of which an axle, or the like, can be bent or straightened, as may be desired, for the purpose of increasing or decreasing the camber thereof.

Axles of automobiles are very difficult to bend with uniformity and heavy presses are used, but this requires the removal of the axles and the consumption of a great deal of time and labor. There are heavy devices permanently anchored and with apparatus connected therewith for accomplishing in a measure what it is the purpose of my invention to accomplish, but, so far as I am aware, there is no portable device or apparatus which can be moved around and so adjusted and attached to an axle without removing it from its place of permanent use, and then manipulated easily for the purpose of uniformly bending or straightening an axle in any place. This makes possible a great saving in labor and also eliminates the necessity of detaching the axle from a motor vehicle, and also eliminates the necessity of detaching and removing other parts, such as splash pans, in order to properly attach the device to the axle.

In order to fully explain my invention and its application and use, I have illustrated one practical embodiment thereof on the accompanying sheet of drawings, in which Figure 1 is a front view of a motor vehicle axle, showing my invention applied thereto ready for operation;

Figure 1:
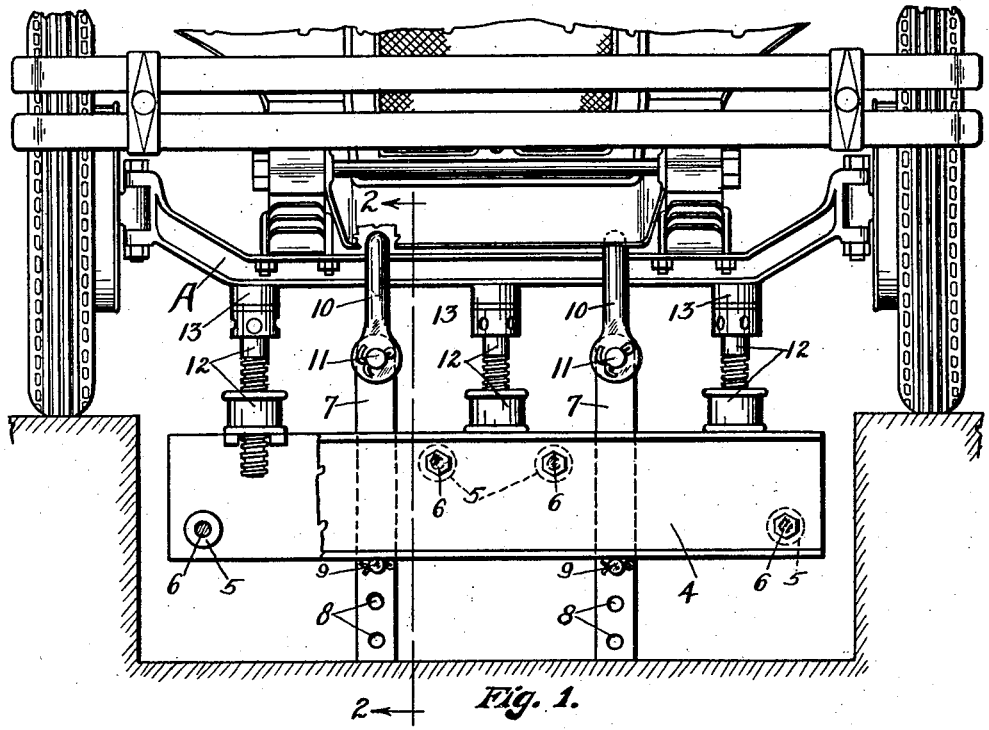
Figure 3:
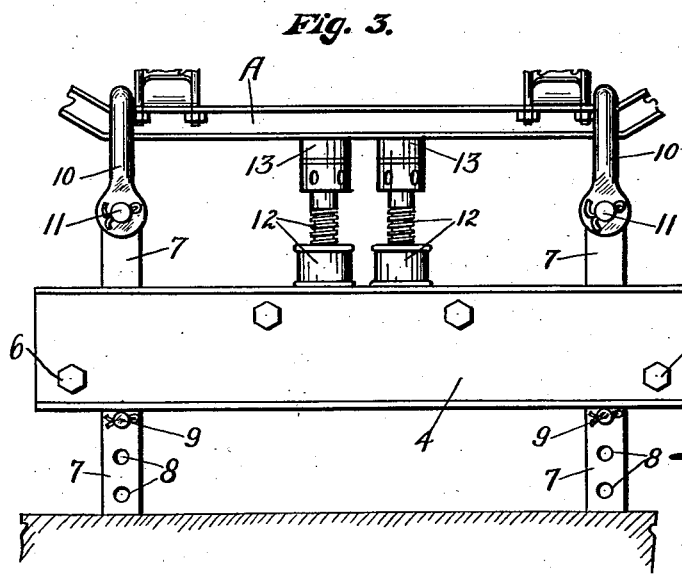
Figure 3 is a view similar to Fig. 1, with parts omitted, showing another adjustment of the apparatus and its attachment to the axle.
Figure 2:
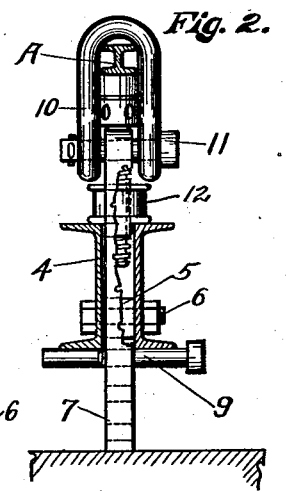
Figure 2 is a sectional view taken on the line 2—2 of Fig. 1.

Referring now in detail to the drawings, I will describe the embodiment of the invention as here illustrated for explanatory purposes. I need not describe the parts of the motor vehicle, other than to refer to the axle, designated A in all figures.

The invention proper comprises a body, 4, shown to be made up of two channel beams, back to back, with spacing sleeves or collars, 5, 5, therebetween on bolts, 6, 6, securing said members together with the space therebetween. Two anchor members, 7, 7, are placed through the space between said channel members, having holes, 8, 8, therethrough, to receive through pins, 9, 9, preferably immediately under the channel members, as indicated, whereby said anchor members can be adjusted longitudinally up and down through the body, 4. The upper ends of said anchor members are provided with clevis-like members, 10, 10, detachably secured to said anchor members by means of pins, 11, 11, said clevis-like members being adapted to be detached and placed over the axle, A, as indicated and then attached to the anchor members, 7, 7.

Screw jacks, 12, 12, are provided and adapted to seat upon said body, 4, with the body or block of the jack having a portion extended down into the space between the channel members, as indicated, to prevent it from turning, and with the screws extending down into said space also, the heads, 13, 13, of said jacks being placed against the axle A in the places to be bent, substantially in the manner illustrated.

Thus it will be seen that I have provided a simple, portable and practical apparatus for bending axles of any reasonable size, said apparatus having a body, with anchor means which can be adjusted through said body and also lengthwise of said body to get the proper attachment to the axle to be operated upon, and with screw jacks also usable along the top of said body in any desired position to get the required bearing.

While I have shown and described but one form or embodiment of the invention, I am aware that changes in the construction and arrangement can be made without departing from the spirit thereof, and I do not limit my invention to the specific showing made, except as I may be limited by the hereto appended claim.

I claim:

An apparatus as shown and described comprising a body made of two channel irons connected back to back with spacing elements therebetween, anchor members adjustable through said space vertically and longitudinally of said space and said body, attaching means on the upper ends of said anchor members for connection to an axle, pins for holding said anchor members against pull out of said body, and a plurality of jacks operable on top of said body, with portions held in said space and with heads to bear against said axle, substantially as and for the purpose referred to.

Signed at Los Angeles, Los Angeles County, California, this 29th day of January, 1927.

LEONARD K. TITUS.